(12) United States Patent
Nagoya

(10) Patent No.: US 6,622,262 B1
(45) Date of Patent: Sep. 16, 2003

(54) FAULT TOLERANT COMPUTER SYSTEM

(75) Inventor: Mitsugu Nagoya, Tokyo (JP)

(73) Assignee: Koken Co., Ltd., Tokyo (JP)

( * ) Notice: Subject to any disclaimer, the term of this patent is extended or adjusted under 35 U.S.C. 154(b) by 0 days.

(21) Appl. No.: 09/475,271

(22) Filed: Dec. 30, 1999

(30) Foreign Application Priority Data

Jan. 11, 1999 (JP) .......................................... 11-003943

(51) Int. Cl.$^7$ ................................................ H02H 3/05
(52) U.S. Cl. .......................................... 714/13; 714/30
(58) Field of Search ........................... 714/13, 727, 30, 714/4, 5, 6; 713/501, 502, 503, 601

(56) References Cited

U.S. PATENT DOCUMENTS

| | | | | |
|---|---|---|---|---|
| 3,623,014 A | * | 11/1971 | Doelz et al. ............... | 714/6 |
| 5,968,150 A | * | 10/1999 | Kametani ............... | 710/100 |
| 6,085,253 A | * | 7/2000 | Blackwell et al. .......... | 709/235 |
| 6,199,183 B1 | * | 3/2001 | Nadaoka ............... | 714/726 |

FOREIGN PATENT DOCUMENTS

| | | |
|---|---|---|
| JP | 01-175042 | 7/1989 |
| JP | 05-307491 | 11/1993 |

* cited by examiner

*Primary Examiner*—Robert Beausoliel
*Assistant Examiner*—Emerson Puente
(74) *Attorney, Agent, or Firm*—Kanesaka & Takeuchi

(57) ABSTRACT

A fault tolerant computer system is provided which can immediately detect that its main computer is down and which can accurately pinpoint the point where the processing is suspended, without delaying the processing which the computer should originally execute. The fault tolerant computer system has: the main computer; an auxiliary computer for normally virtually executing the same processing as that executed by the main computer; a communication element connected to an object, the communication element being a boundary scan element; and a switch unit for switching connection between the communication element and either the main computer or the auxiliary computer. The switch unit switches the connection in accordance with the presence or absence of a clock signal supplied from the main computer to the communication element.

8 Claims, 5 Drawing Sheets

FAULT TOLERANT COMPUTER SYSTEM

FIELD OF THE INVENTION

The present invention relates to a fault tolerant computer system, and more particularly to a fault tolerant computer system in which a boundary scan element is used as a communication element.

BACKGROUND ART

A computer for use in a monitoring system in a building, various data bases, a cash dispenser in a financial institution or the like requires nonstop, continuous processing for 24 hours or a predetermined time period.

A so-called fault tolerant computer system has been therefore proposed in order to avoid the suspension of the processing due to a fault of the computer or the like.

The fault tolerant computer system is the system in which the computer is duplicated or multiplexed and processing executed by a main computer is always made to be virtually executed by the other computer, whereby the other computer is caused to succeed to the processing when the main computer goes down. Therefore, according to this system, even when the main computer actually executing predetermined processing goes down, the processing is immediately continued by the other computer and thus the suspension of the processing can be avoided.

In such a fault tolerant computer system, what is important in order for the other computer to succeed to a series of processing without delay when the main computer goes down is as follows: the other computer quickly detects that the main computer has gone down, and discriminates the processing which has been executed when the main computer has gone down.

In this regard, a discriminating method using a watchdog timer, for example, has been heretofore suggested. This discriminating method using a watchdog timer is the method in which a signal is supplied from the main computer to the other computer at a fixed timing. As long as the signal is supplied to the other computer, the other computer recognizes that the main computer normally operates. When the signal is not supplied within a fixed time period, the other computer recognizes that the main computer has gone down, and thus succeeds to the processing.

However, if the discrimination is made in accordance with such a watchdog timer, a problem arises about an interval at which the signal is supplied. That is, when the signal is supplied at shorter intervals, the other computer can more quickly detect that the main computer is down, and more easily pinpoints the point at which the processing is suspended. However, the processing of supplying the signal or the like is performed more frequently and thus the processing to be originally executed by the computer is delayed. On the contrary, when the signal is supplied at longer intervals, the processing to be originally executed by the computer is not delayed. However, the other computer more slowly detects that the main computer is down, and less accurately determines the point at which the processing is suspended. Consequently, the other computer may fail to succeed to the processing.

Moreover, the processing for the watchdog timer is executed asynchronously with the processing which the computer should originally perform. From the beginning, it is thus difficult to accurately pinpoint the point where the processing is suspended.

SUMMARY OF THE INVENTION

It is therefore an object of the present invention to provide a fault tolerant computer system which can immediately detect that the main computer is down and which can accurately pinpoint the point where the processing is suspended, without delaying the processing which: the computer should originally execute.

Here, the inventor does not regard a boundary scan element for performing a wiring test for an electronic circuit substrate or an operation test for ICs on the substrate as the element only for a wiring connection check or the like. In other words, the inventor pays attention to the usefulness of the boundary scan element as a communication element for controlling various objects such as a CCD camera. Accordingly, the inventor has proposed a communication apparatus in which this boundary scan element is applied to the communication element (International Publication No. WO98/55925 and so on).

The inventor now uses the boundary scan element as the communication element in a fault tolerant computer system, thereby solving the above problem by the following means.

That is, according to the present invention, there is provided a fault tolerant computer system which has: a main computer; an auxiliary computer for normally virtually executing the same processing as that executed by the main computer; a communication element connected to an object; and switch means for switching connection between the communication element and either the main computer or the auxiliary computer, wherein the communication element is a boundary scan element, and the switch means switch the aforesaid connection in accordance with the presence or absence of a clock signal supplied from the main computer to the communication element.

According to these means, the switch means normally establish connection between the main computer and the communication element which is a boundary scan element, and the object is handled by the main computer. Various data communications between the main computer and the object are accomplished through the communication element, or the boundary scan element. Meanwhile, the auxiliary computer virtually executes quite the same processing as the processing which the main computer applies to the object.

When the main computer goes down, the main computer stops sending out the clock signal to the communication element. At this time, the switch means function so that the object may be processed by the auxiliary computer instead of the main computer. That is to say, the switch means break the connection between the main computer and the communication element, and establish connection between the auxiliary computer and the communication element.

This makes the auxiliary computer actually execute the processing for the object through the communication element. As a result, a series of processing for the object is avoided from being suspended.

By such functions, these means achieve the following specific effects.

First, whether or not the main computer is down is determined in accordance with the presence or absence of the clock signal supplied from the main computer to the communication element. The main computer and the auxiliary computer do not mutually determine whether or not the main computer is down. Thus, the processing which the main computer should originally execute is not delayed regardless of a cycle of the clock signal.

Second, the communication element which is a boundary scan element executes its processing in synchronization with the clock signal. Therefore, it is very easy to specify which processing the main computer was executing just before going down.

In the present invention, the main computer means a computer for normally executing the communication processing with the object. The auxiliary computer means a computer for replacing the main computer to execute the communication processing with the object when the main computer goes down. The above-stated phrase "virtually executing the same processing" means that the auxiliary computer at least keeps track of the processing which is being executed by the main computer and the auxiliary computer is in a state where it can continue that processing as needed.

A combination of logic ICs, a programmable logic device (hereinafter referred to as PLD), or the like can be used as the switch means.

Description of the aforementioned boundary scan element in the present invention will here be preceded by the discussion on the prior art of the boundary scan element and the function thereof as a communication element.

FIG. 5(a) is a block diagram of a general boundary scan element 100. The boundary scan element 100 includes a package 110 containing input-side boundary cells 103 individually provided for input-side terminals 101, output-side boundary cells 104 individually provided for output-side terminals 102, TDI and TDO terminals 105 and 106 for inputting and outputting data to/from the boundary cells 103 and 104, a TAP circuit 107, a TCK terminal 108 for supplying the clock signal to the TAP circuit 107, and a TMS terminal 109 for supplying an operation mode switch signal to the TAP circuit 107.

The input-side and output-side boundary cells 103 and 104 are connected in series in chain together. The TDI and TDO terminals 105 and 106 are connected to the respective end cells of the boundary cells 103 and 104, respectively. Serial data inputted from the TDI terminal 105 can be set in all the boundary cells 103 and 104 by shifting the serial data through the boundary cells 103 and 104 in order. The data set in all the boundary cells 103 and 104 are shifted in order, whereby the data can also be sent out as serial data from the TDO terminal 106 to the outside.

The input-side boundary cells 103 can capture the data from the input-side terminals 101 and can output the set data to the input-side terminals 101. This also applies to between the output-side boundary cells 104 and the output-side terminals 102.

The TAP circuit 107 executes the predetermined processing associated with the boundary cells 103 and 104 in synchronization with the clock signal supplied from the TCK terminal 108 and in accordance with the operation mode switch signal supplied from the TMS terminal 109. For example, the TAP circuit 107 executes processing as follows: capturing data from the TDI terminal 105 and shifting or setting the same to the boundary cells 103 and 104 respectively; outputting the data set in the respective boundary cells 103 and 104 from the TDO terminal 106; and inputting/outputting data between the input-side terminals 101 and the input-side boundary cells 103 and inputting/outputting data between the output-side terminals 102 and the output-side boundary cells 104.

When a TCK line and a TMS line are very long, a TMS signal may be late for the clock signal. Therefore, as shown in FIG. 5(d), two TMS terminals 109 and two TCK terminals 108 can be provided so that one TMS terminal 109 and one TCK terminal 108 are used as the input-side terminals while the others are used as the output-side terminals. Here, the TMS signal and the clock signal are once captured and latched in the TAP circuit 107 and these signals are then outputted from the TAP circuit 107, whereby such a delay can be eliminated.

When the boundary scan element 100 is used as a communication element, for instance, the input-side terminals 101 are connected to input terminals of the objects of communication (the objects to be processed) and the output-side terminals 102 are connected to output terminals of the objects of communication. The TDI terminal 105, the TDO terminal 106, the TCK terminal 108 and the TMS terminal 109 are connected to a host computer.

The clock signal and the TMS signal are sent out from the host computer, whereby the TAP circuit 107 is caused to execute the predetermined processing and thus the data communication is performed between the host computer and the objects of communication. For example, control data are transmitted to the TDI terminal 105, the data are set in the input-side boundary cells 103, and furthermore the data are sent out from the input-side terminals 101 to the objects of communication, whereby the objects of communication are controlled. Alternatively, the data obtained or analyzed by the objects of communication are captured from the output-side terminals 102 into the output-side boundary cells 104, the data are outputted from the TDO terminal 106, and the data are received by the host computer.

In this manner, the boundary scan element 100 can function as the communication element.

Another example of the boundary scan element 100 may have the above-mentioned constitution of the boundary scan element 100 added with an RST terminal for supplying a reset signal to the TAP circuit 107, a bypass line for short-circuiting the TDI terminal 105 and the TDO terminal 106, an ID code register between the TDI terminal 105 and the TDO terminal 106, or the like.

In another example of the boundary scan element 100, as shown in FIG. 5(b), all input-side boundary cells 103' and output-side boundary cells 104' are not connected in series, and the boundary cells 103' and 104' are connected in parallel between a TDI terminal 105' and a TDO terminal 106'. Here, the reference numerals of FIG. 5(b) correspond to those of FIG. 5(a).

In still another example of the boundary scan element 100, as shown in FIG. 5(c), input-side boundary cells 103" and output-side boundary cells 104" are connected in parallel. A TDI terminal 105" and a TDO terminal 106" are assigned to each of the boundary cells 103" and 104", respectively. An input-side terminal 101" and an output-side terminal 102" are connected to a TAP circuit 107".

As described above, various boundary scan elements themselves have been proposed. Meanwhile, the present invention uses a boundary scan element as communication element and requires a clock signal. Thus, the boundary scan element of the present invention necessarily has at least boundary cells, a TAP circuit, a TCK terminal, and a TMS terminal. However, the above-described additional constitution, the method of connecting the boundary cells, the number of bits of the boundary cells and so on may be optionally selected.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Embodiment 1

Figure 1:
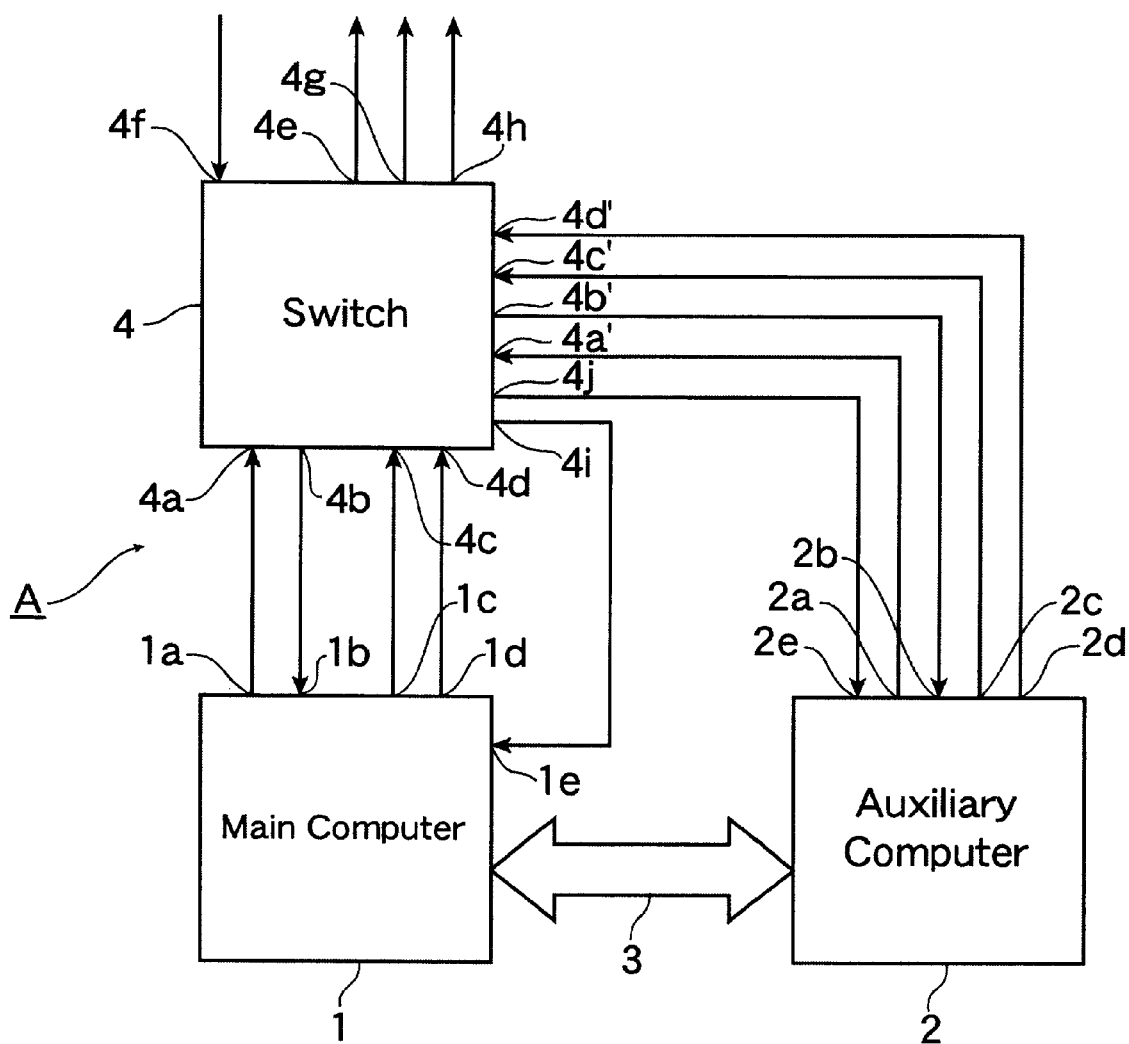
FIG. 1 is a block diagram of a fault tolerant computer system A according to a first embodiment of the present invention.

Hereinafter, preferred embodiments of the present invention will be described with reference to the accompanying drawings. FIG. 1 is a block diagram of a fault tolerant computer system A according to the present invention.

The fault tolerant computer system A is the system for nonstop and continuously processing communication with objects of communication or objects to be processed (hereinafter in the present embodiment below, represented as "object devices"). In this embodiment, the fault tolerant computer system A includes a main computer 1, an auxiliary computer 2, and a switch 4 for switching connection between object devices and either the main computer 1 or the auxiliary computer 2. The object devices include a variety of devices such as communication means, processors, and various input/output devices (I/Os) for sending and receiving data to/from the main computer 1.

The main computer 1 and the auxiliary computer 2 share a dual port RAM 3. The main computer 1 and the auxiliary computer 2 can freely write and read data to/from the dual port RAM 3. The main computer 1 and the auxiliary computer 2 can mutually share these data. Accordingly, when the main computer 1 is in normal operation, the auxiliary computer 2 keeps track of the processing which is being executed by the main computer 1, in accordance with the data written to the dual port RAM 3. Thus, the auxiliary computer 2 can execute the same processing, so to speak, virtually.

The object devices are controlled in accordance with data received from the main computer 1 or the auxiliary computer 2 through the switch 4. The object devices also send out data obtained through their processing to the main computer 1 or the auxiliary computer 2.

The switch 4 is composed of a PLD for either connecting an output terminal 4e, an input terminal 4f, a TMS output terminal 4g, and a TCK output terminal 4h to an input terminal 4a, an output terminal 4b, a TMS input terminal 4c, and a TCK input terminal 4d, respectively, or connecting the output terminal 4e, the input terminal 4f, the TMS output terminal 4g, and the TCK output terminal 4h to an input terminal 4a', an output terminal 4b', a TMS input terminal 4c', and a TCK input terminal 4d', respectively. The PLD establishes the terminal connections in accordance with the presence or absence of a clock signal sent from a TCK terminal 1d of the main computer 1. Namely, when the clock signal is sent out from the main computer 1, the connections are established to the input terminal 4a, the output terminal 4b, the TMS input terminal 4c, and the TCK input terminal 4d. When the clock signal is stopped, the connections are established to the input terminal 4a', the output terminal 4b', the TMS input terminal 4c', and the TCK input terminal 4d'.

The switch 4 further has a select signal output terminal 4i connected to a select signal input terminal 1e of the main computer 1, and a select signal output terminal 4j connected to a select signal input terminal 2e of the auxiliary computer 2. When the fault tolerant computer system 1 is in operation, the switch 4 sends out a select signal informing which computer is selected to either one of the select signal input terminal 1e of the main computer 1 and the select signal input terminal 2e of the auxiliary computer 2, and sends out a non-select signal to the other. Specifically, when the clock signal is sent out from the TCK terminal 1d of the main computer 1, the select signal and the non-select signal are sent out to the main computer 1 and the auxiliary.computer 2, respectively. When the clock signal is stopped, the non-select signal and the select signal are sent out to the main computer 1 and the auxiliary computer 2, respectively. The main computer 1 and the auxiliary computer 2 can determine which computer should actually handle the object devices, in accordance with the select and non-select signals.

The select and non-select signals have only to inform the auxiliary computer 2 of the point for actual execution of the processing, and are not necessarily sent out to the main computer 1. Therefore, these signals may be sent to the auxiliary computer 2 alone. Sending the select and non-select signals to both the main and auxiliary computers 1 and 2, however, is useful for restoring the main computer 1 after the main computer 1 goes down.

Next, description will be made on the function of the fault tolerant computer system A of FIG. 1 composed of such a constitution.

Initially, when the main computer 1 normally operates, i.e., when the clock signal is continuously sent out from the TCK terminal 1d of the main computer 1 to the TCK input terminal 4d of the switch 4, the switch 4 connects the output terminal 4e, the input terminal 4f, the TMS output terminal 4g, and the TCK output terminal 4h to the input terminal 4a, the output terminal 4b, the TMS input terminal 4c, and the TCK input terminal 4d, respectively. The switch 4 also sends out the select signal and the non-select signal from the select signal output terminals 4i and 4j to the main computer 1 and the auxiliary computer 2, respectively. Consequently, the main computer 1 can actually execute the communication processing with the object devices, and the auxiliary computer 2 can recognize that the main computer 1 is in normal operation.

The main computer 1 sequentially writes to the dual port RAM 3 the data or the like obtained as the result of the communication processing. The written data are shared by the main computer 1 and the auxiliary computer 2. This allows the auxiliary computer 2 to virtually execute the same processing as that executed by the main computer 1.

Now, when a fault occurs in the main computer 1 and thus the processing is stopped, the clock signal from the TCK terminal 1*d* is stopped. Here, the switch 4 recognizes that the clock signal is stopped, and then sends out the non-select signal and the select signal from the select signal output terminals 4*i* and 4*j* to the main computer 1 and the auxiliary computer 2, respectively. The switch 4 also connects the output terminal 4*e*, the input terminal 4*f*, the TMS output terminal 4*g*, and the TCK output terminal 4*h* to the input terminal 4*a*', the output terminal 4*b*', the TMS input terminal, 4*c*', and the TCK input terminal 4*d*', respectively.

The auxiliary computer 2 identifies from the select signal received that the main computer 1 has gone down. The auxiliary computer 2 functions so as to actually execute with the object devices the processing it has executed virtually, thereby preventing the object devices from stopping.

In this case, the auxiliary computer 2 very exactly succeeds to the processing executed by the main computer 1. The reason for this is that since the object devices perform the communication processing in perfect synchronization with the clock signal, the point itself at which the clock signal is stopped can be recognized as the point at which the communication processing by the main computer 1 is suspended. Accordingly, at the point of time when it receives the select signal from the switch 4, the auxiliary computer 2 can shift from the processing which it has virtually executed to the actual processing with reference to the data recorded in the dual port RAM 3, so that the processing of the object devices is continued without ever being suspended.

Moreover, whether or not the main computer 1 has gone down is determined in accordance with the presence or absence of the clock signal sent out from the main computer 1 as described above. This eliminates the need for recognition processing between the main computer 1 and the auxiliary computer 2, thereby avoiding the delay in the processing.

Embodiment 2

Figure 2:
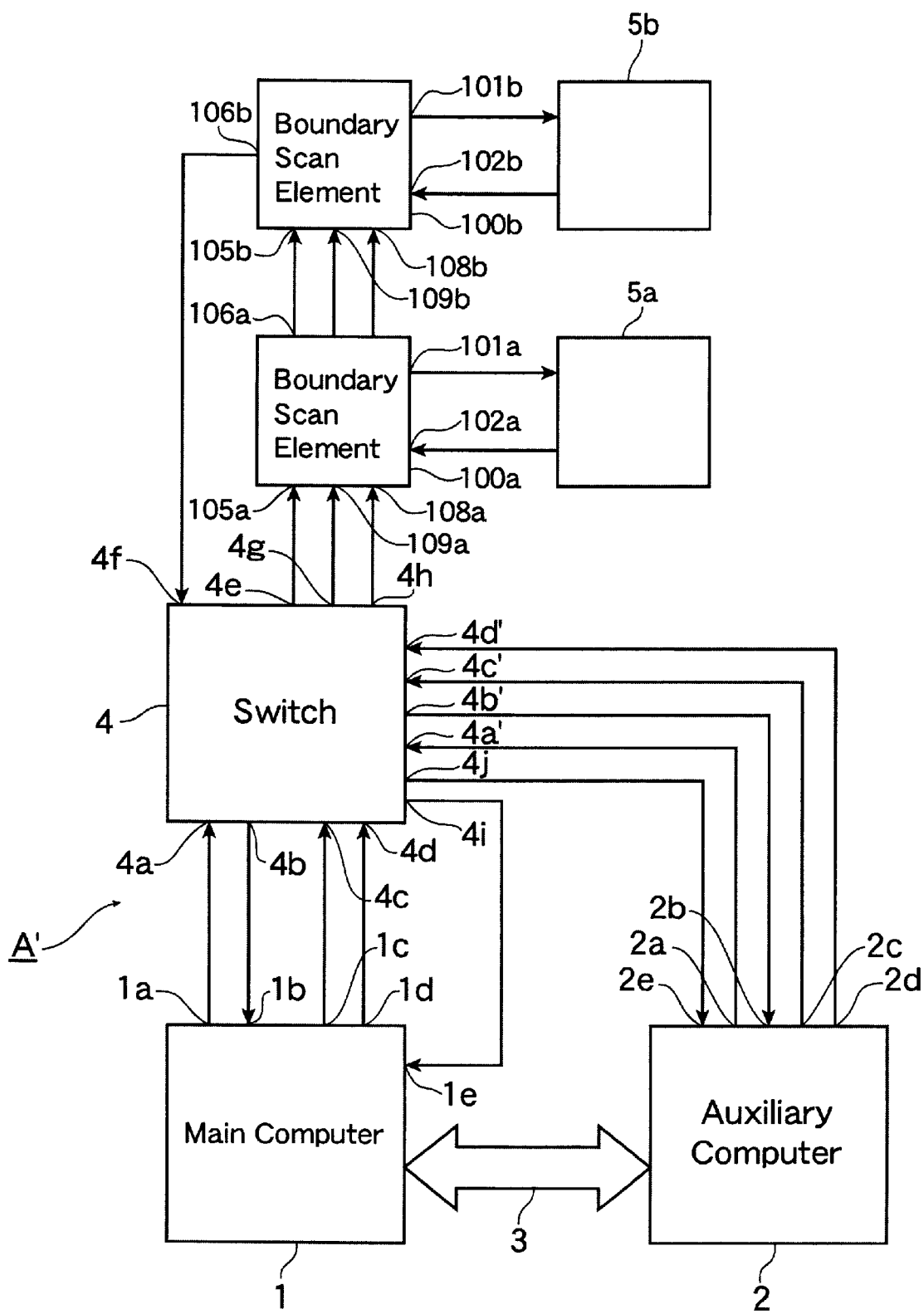
FIG. 2 is a block diagram of a fault tolerant computer system A' according to a second embodiment of the present invention.

Now, description will be given of a second embodiment of the fault tolerant computer system according to the present invention. FIG. 2 is a block diagram of a fault tolerant computer system A' according to the second embodiment of the present invention. In this embodiment, the fault tolerant computer system includes a main computer 1, an auxiliary computer 2, a dual port ram 3, and a switch 4 which are exactly the same in constitution as those of the first embodiment described above.

The fault tolerant computer system A' is the system for nonstop and continuously handling objects 5*a* and 5*b*. The fault tolerant computer system A' includes the main computer 1, the auxiliary computer 2, communication elements 100*a* and 100*b* connected to the objects 5*a* and 5*b*, respectively, and the switch 4 for switching connection between the communication elements 100*a*, 100*b* and either the main computer 1 or the auxiliary computer 2.

The main computer 1 and the auxiliary computer 2 share the dual port RAM 3. The main computer 1 and the auxiliary computer 2 can freely write and read data to/from the dual port RAM 3. The main computer 1 and the auxiliary computer 2 can mutually share these data. Therefore, when the main computer 1 is in normal operation, the auxiliary computer 2 keeps track of processing which is.being executed by the main computer 1, in accordance with the data written to the dual port RAM 3. Thus, the auxiliary computer 2 can execute the same processing, so to speak, virtually.

The objects 5*a* and 5*b* include a cash dispenser in a financial institution, a communication line, and a monitoring apparatus or the like. The objects 5*a* and 5*b* are controlled in accordance with data received from the main computer 1 or the auxiliary computer 2 through the communication element 100*a* or 100*b*. They also send out the detected data or other data to the main computer 1 or the auxiliary computer 2.

Both of the communication elements 100*a* and 100*b* are boundary scan elements. In particular, in this embodiment, a boundary scan element 100 of FIG. 5(*a*) described above is used as both the communication elements 100*a* and 100*b*. In the following description and the drawings, reference numerals applied to the communication elements 100*a* and 100*b* correspond to those of the boundary scan element 100 and its parts.

In this embodiment, the two communication elements 100*a* and 100*b* are provided so as to correspond in number to the objects 5*a* and 5*b*. However, the present invention is not limited thereto, and more or less communication elements may be provided.

The communication elements 100*a* and 100*b* are connected in series to the switch 4. Specifically, a TDO terminal 106*a* of the communication element 100*a* is connected to a TDI terminal 105*b* of the communication element 100*b*, a TDI terminal 105*a* of the communication element 100*a* is connected to an output terminal 4*e* of the switch 4, and a TDO terminal 106*b* of the communication element 100*b* is connected to an input terminal 4*f* of the switch 4. TCK terminals 108*a*, 108*b* and TMS terminals 109*a* and 109*b* of the communication elements 100*a*, 100*b* are connected to a TCK output terminal 4*h* and a TMS output terminal 4*g* of the switch 4, respectively.

The switch 4 is a PLD for connecting the output terminal 4*e*, the input terminal 4*f*, the TMS output terminal 4*g*, and the TCK output terminal 4*h* to either an input terminal 4*a*, an output terminal 4*b*, a TMS input terminal 4*c*, and a TCK input terminal 4*d* or an input terminal 4*a*', an output terminal 4*b*', a TMS input terminal 4*c*', and a TCK input terminal 4*d*' in accordance with the presence or absence of a clock signal sent out from a TCK terminal 1*d* of the main computer 1. Namely, when the clock signal is sent out from the main computer 1, the output terminal 4*e*, the input terminal 4*f*, the TMS output terminal 4*g*, and the TCK output terminal 4*h* are connected to the input terminal 4*a*, the output terminal 4*b*, the TMS input terminal 4*c*, and the TCK input terminal 4*d*, respectively. When the clock signal is stopped, the output terminal 4*e*, the input terminal 4*f*, the TMS output terminal 4*g*, and the TCK output terminal 4*h* are connected to the input terminal 4*a*', the output terminal 4*b*', the TMS input terminal 4*c*', and the TCK input terminal 4*d*', respectively.

The switch 4 has select signal output terminals 4*i* and 4*j*. A select signal or a non-select signal informing which computer is selected is sent from the select signal output terminals 4*i* and 4*j* to a select signal input terminal 1*e* of the main computer 1 or a select signal input terminal 2*e* of the auxiliary computer 2. Specifically, when the clock signal is sent out from the TCK terminal 1*d* of the main computer 1, the select signal and the non-select signal are sent to the main computer 1 and the auxiliary computer 2, respectively. When the clock signal is stopped, the non-select signal and the select signal are sent to the main computer 1 and the auxiliary computer 2, respectively. The main computer 1 and the auxiliary computer 2 can determine which computer should actually handle the objects 5*a* and 5*b*, in accordance with these signals.

Since these signals have only to inform the auxiliary computer 2 of the point for actual execution of the processing, they are not necessarily sent to the main computer 1. Sending these signals thereto, however, is useful for restoring the main computer 1 after the main computer 1 goes down.

Next, the communication processing between the main computer 1 and the communication elements 100a, 100b and objects 5a, 5b is executed e.g. in the following manner.

The main computer 1 always sends out the clock signal from the TCK output terminal 1d. To send out data from the main computer 1 to the objects 5a and 5b, the main computer 1 first sends out a TMS signal from a TMS output terminal 1c to TAP circuits 107a, 107b (not shown in FIG. 2) of the communication elements 100a, 100b through the switch 4. This switches the operation mode of the TAP circuits 107 a and 107b to the setting of the data to input-side boundary cells 103a (not shown in FIG. 2).

Subsequently, the main computer 1 sends out predetermined data in a serial form from its data output terminal 1a to the TDI terminal 105a of the communication element 100a through the input terminal 4a and the output terminal 4e of the switch 4. In the communication element 100a, the data inputted from the TDI terminal 105a are transferred to the boundary cells 103a and 104a one after another. Furthermore, these data are sent out from the TDO terminal 106a to the TDI terminal 105b of the communication element 100b. In the communication element 100b, these data are similarly transferred to boundary cells 103b and 104b. Then, when necessary data are supplied to all the input-side boundary cells 103a and 103b of the communication elements 100a and 100b, the data are set therein.

Next, the main computer 1 again sends out a TMS signal to switch the operation mode of the TAP circuits 107a and 107b. Thus, the communication elements 100a and 100b send out the data, which are set in the input-side boundary cells 103a and 103b, from an input-side terminal 101a or 101b to the object 5a or 5b. The object 5a or 5b executes the processing in accordance with the contents of the data.

In contrast, when data are sent from the object 5a or 5b to the main computer 1, the main computer 1 first issues a data output command to the object 5a or 5b by the above-described procedure. As a result, the data outputted from the object 5a or 5b are transmitted to an output-side terminal 102a or 102b of the communication element 100a or 100b.

Then, the main computer 1 sends out a TMS signal to switch the operation mode of the TAP circuits 107 a and 107b. Thereby, the communication elements 100a and 100b set the data transmitted to the output-side terminal 102a or 102b into the output-side boundary cell 104a or 104b.

The main computer 1 again sends out a TMS signal to switch the operation mode of the TAP circuits 107 a and 107b. Thus, the data set in the output-side boundary cells 104a and 104b are serially transferred and sent out as serial data from the TDO terminal 106b of the communication element 100b.

The main computer 1 captures the transmitted data from a data input terminal 1b through the input terminal 4f and the output terminal 4b of the switch 4, and the main computer 1 can execute the processing such as the writing the captured data to the dual port RAM 3 or the like.

In quite the same manner as that in the communication processing between the main computer 1 and the communication elements 100a, 100b, and objects 5a, 5b, the communication processing is performed between the auxiliary computer 2 and the communication elements and objects in the case where the main computer 1 is down. Thus, description thereto is omitted here.

Next, the function of the fault tolerant computer system A' of FIG. 2 composed of such a constitution will be described below.

Initially, when the main computer 1 is in normal operation, i.e., when the clock signal is continuously sent out from the TCK terminal 1d of the main computer 1 to the TCK input terminal 4d of the switch 4, the switch 4 connects the output terminal 4e, the input terminal 4f, the TMS output terminal 4g, and the TCK output terminal 4h to the input terminal 4a, the output terminal 4b, the TMS input terminal 4c, and the TCK input terminal 4d, respectively. The switch 4 also sends out the select signal and the non-select signal from the select signal output terminals 4i and 4j to the main computer 1 and the auxiliary computer 2, respectively. Thus, the main computer 1 can actually execute the processing for the communication with the objects 5a and 5b through the communication elements 100a and 100b. The auxiliary computer 2 can recognize that the main computer 1 is in normal operation.

The main computer 1 sequentially writes data or the like obtained as the result of the communication processing to the dual port RAM 3. The written data are shared by the main computer 1 and the auxiliary computer 2. Thus, the auxiliary computer 2 can virtually execute the same processing as that executed by the main computer 1.

Now, when a fault occurs in the main computer 1 and thus the processing is stopped, the clock signal from the TCK terminal 1d is stopped. At this time, the switch 4 recognizes that the clock signal is stopped, and then sends out the non-select signal and the select signal from the select signal output terminals 4i and 4j to the main computer 1 and the auxiliary computer 2, respectively. The switch 4 also connects the output terminal 4e, the input terminal 4f, the TMS output terminal 4g, and the TCK output terminal 4h to the input terminal 4a', the output terminal 4b', the TMS input terminal 4c', and the TCK input terminal 4d', respectively.

The auxiliary computer 2 identifies from the select signal received that the main computer 1 has gone down. Then, the auxiliary computer 2 functions so as to actually execute the processing, which the auxiliary computer 2 has virtually executed, with the objects 5a and 5b through the communication elements 100a and 100b. This prevents the objects 5a and 5b from stopping.

Here, the auxiliary computer 2 very exactly succeeds to the processing executed by the main computer 1. The reason for this is that since the communication elements 100a and 100b execute the communication processing in perfect synchronization with the clock signal, the point itself at which the clock signal is stopped can be recognized as the point at which the communication processing by the main computer 1 is suspended. Accordingly, at the point of time when it receives the select signal from the switch 4, the auxiliary computer 2 can shift from the processing which it has virtually executed to the actual processing with reference to the data recorded in the dual port RAM 3, so that the processing by the objects 5a and 5b is continued without ever being suspended.

Moreover, whether or not the main computer 1 has gone down is determined in accordance with the clock signal sent out from the main computer 1 as described above. This eliminates the need for recognition processing between the main computer 1 and the auxiliary computer 2, thereby avoiding the delay in the processing.

Embodiment 3

Figure 3:
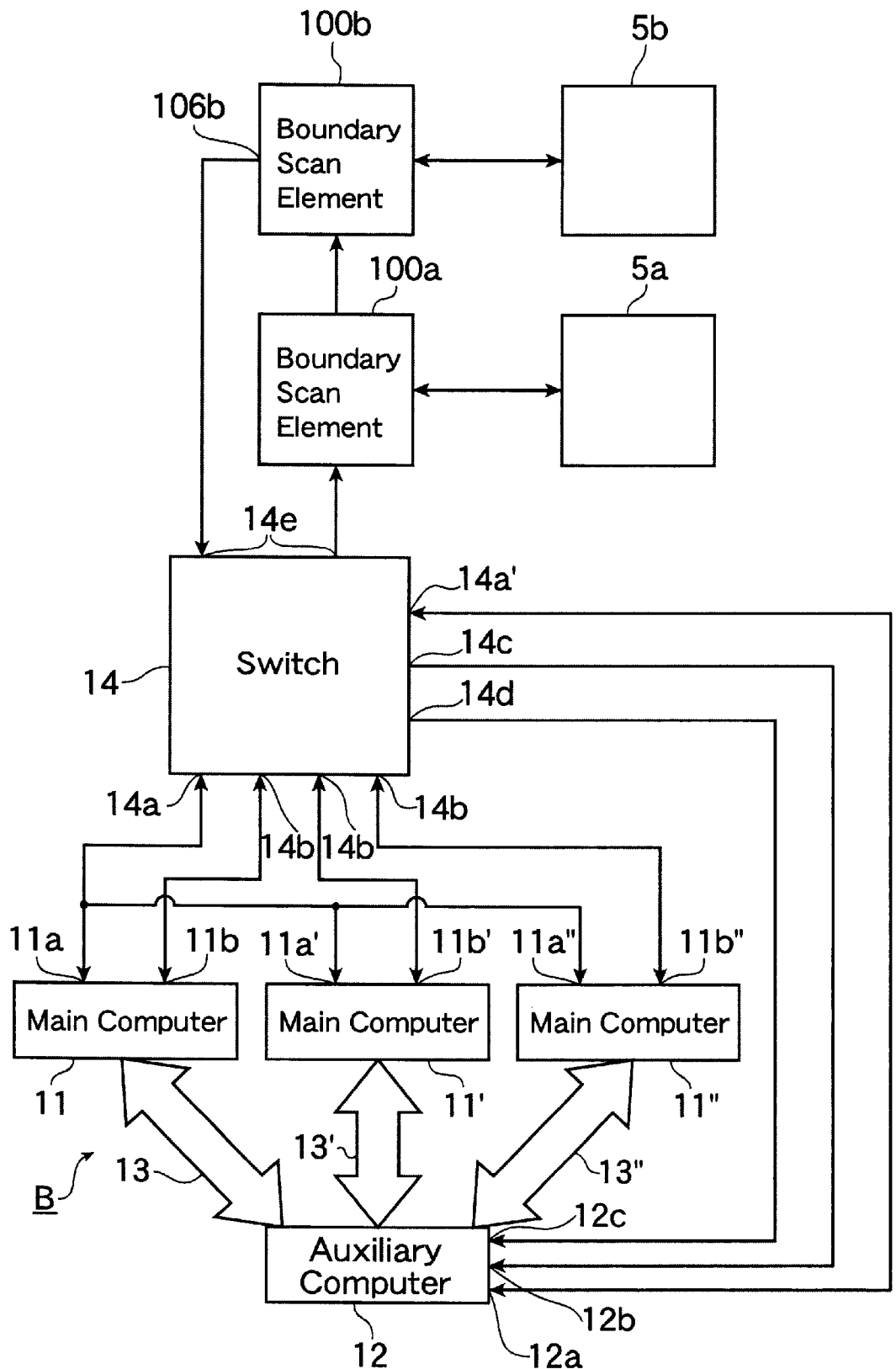
FIG. 3 is a block diagram of a fault tolerant computer system B according to a third embodiment of the present invention.

Now, description will be given of a third embodiment of the fault tolerant computer system according to the present invention. FIG. 3 is a block diagram of such fault tolerant computer system B.

Like the fault tolerant computer system A', the fault tolerant computer system B is the system for nonstop and continuously handling the objects 5a and 5b. However, the fault tolerant computer system B is characterized in particular by that a plurality of main computers 11, 11', and 11" for executing different processing contents are provided and a switch 14 has a function of switching and driving the main computer 11, 11', or 11'.

That is, the fault tolerant computer system B includes the plurality of main computers 11, 11', and 11", a single auxiliary computer 12, communication elements 100a and 100b connected to the objects 5a and 5b, respectively, and the switch 14 for switching connection between the communication elements 100a, 100b and either the main computers 11, 11', 11", or the auxiliary computer 12.

As stated above, the main computers 11, 11', and 11" are the computers for separately executing different processing. One computer is selected in accordance with the contents of the processing for the objects 5a and 5b.

This selection is recognized in accordance with the select signal sent out from the switch 14 to select signal terminals 11b, 11b', and 11b" of the main computers 11, 11', and 11".

The main computers 11, 11', and 11" have communication terminal groups 11a, 11a', and 11a" each group corresponding to the data output terminal 1a, the data input terminal 1b, the TMS output terminal 1c, and the TCK output terminal 1d of the main computer 1 in the fault tolerant computer system A' described above. Through these communication terminal groups, the main computers 11, 11', and 11" execute the same communication processing as that by the above-described main computer 1.

While three main computers are provided in this embodiment, the number of main computers is not limited thereto.

The auxiliary computer 12 can execute the processing contents to be executed by the main computers 11, 11', and 11'.

Moreover, the auxiliary computer 12 has an identification signal terminal 12b for receiving the signal for identifying which main computer 11, 11', or 11" actually executes the processing. In accordance with the identification signal from the switch 14, the auxiliary computer 12 identifies the main computer 11, 11', or 11" which actually executes the processing. The auxiliary computer 12 further includes a select signal terminal 12 c for receiving the select signal indicating whether or not the selected main computer 11, 11', or 11" is down. In accordance with this select signal, the auxiliary computer 12 determines whether or not the main computer 11, 11', or 11" is in normal operation.

Meanwhile, the auxiliary computer 12 has a communication terminal group 12a corresponding to the data output terminal 2a, the data input terminal 2b, the TMS output terminal 2c, and the TCK output terminal 2d of the auxiliary computer 2 in the above-mentioned fault tolerant computer system A'. The auxiliary computer 12 executes the same communication processing as that by the above-described auxiliary computer 2 through this communication terminal group.

The main computers 11, 11', and 11" and the auxiliary computer 12 share corresponding dual port RAMs 13, 13', and 13", respectively. The main computers 11, 11', and 11" and the auxiliary computer 12 can freely write and read data to/from the corresponding dual port RAMs 13, 13', and 13". The main computers 11, 11', and 11" and the auxiliary computer 12 can mutually share these data.

Accordingly, when the main computer 11, 11', or 11" actually executing the processing is in normal operation, the auxiliary computer 12 keeps track of the processing which is being executed by the main computer 11, 11', or 11", in accordance with the data written to the corresponding dual port RAM 13, 13', or 13". This allows the auxiliary computer 12 to execute the same processing, so to speak, virtually.

The switch 14 is a PLD having communication terminal groups 14a, 14a', and 14e. The communication terminal group 14a is connected in parallel with the communication terminal groups 11a, 11a', and 11a" of the main computers 11, 11', and 11". The communication terminal group 14a corresponds to the input terminal 4a, the output terminal 4b, the TMS input terminal 4c, and the TCK input terminal 4d of the switch 4 in the fault tolerant computer system A' described above. The communication terminal group 14a' is connected to the communication terminal group 12a of the auxiliary computer 12. The communication terminal group 14a' corresponds to the input terminal 4a', the output terminal 4b', the TMS input terminal 4c', and the TCK input terminal 4d' of the switch 4 in the system A'. The communication terminal group 14e corresponds to the output terminal 4e, the input terminal 4f, the TMS output terminal 4g, and the TCK output terminal 4h of the switch 4 in the system A'. The PLD, or the switch 14, connects the communication terminal group 14e to either communication terminal group 14a or 14a' in accordance with the presence or absence of a clock signal sent out from the selected main computer 11, 11', or 11".

The switch 14 also has the following terminals: select signal terminals 14b for sending out the select signal to the main computers 11, 11', and 11"; an identification signal terminal 14c for sending to the auxiliary computer 12 the identification signal for identifying the selected main computer 11, 11', or 11"; and a select signal terminal 14 d for sending out the select signal indicating whether or not the selected main computer 11, 11', or 11" is down.

The relationship between the switch 14 and the communication elements 100a, 100b is the same as that in the aforementioned fault tolerant computer system A'. Thus, description thereto is omitted here.

Next, description will be made on the function of the fault tolerant computer system B composed of such a constitution.

Initially, when one of the main computers 11, 11', and 11" is selected, e.g., when the main computer 11 is selected, the switch 14 sends out the non-select signal from the select signal terminals 14b to the main computers 11' and 11", thereby stopping these main computers 11' and 1" from executing their processing. At the same time, the switch 14 sends out the identification signal from the identification signal terminal 14c to the auxiliary computer 12, thereby notifying the auxiliary computer 12 that the main computer 11 is selected.

In accordance with this identification signal, the auxiliary computer 12 virtually executes the same processing as that by the main computer 11, with reference to the data in the dual port RAM 13 so as to prepare for the case where the main computer 11 goes down.

As long as the clock signal is sent from the main computer 11, the switch 14 maintains the connection between the communication terminal groups 14a and 14e, so that the main computer 11 executes the communication processing with the objects 5a and 5b through the communication elements 100a and 100b. The communication processing method is the same as that in the above-described fault tolerant computer system A' Thus, description thereto is omitted here.

To switch the main computer 11 to another main computer, e.g., to cause the main computer 11' to execute its processing, the main computer 11 sends out the select signal from the select signal terminal 11b to the switch 14 so that the main computer 11' may be selected. The switch 14 receives this select signal and then sends out the non-select signals and the select signal from the select signal terminals 14b to the main computers 11, 11" and the main computer 11', respectively. Meanwhile, the switch 14 sends out the identification signal from the identification signal terminal 14c to the auxiliary computer 12, thereby notifying the auxiliary computer 12 that the main computer 11' is selected.

In accordance with this identification signal, the auxiliary computer 12 virtually executes the same processing as that by the main computer 11', with reference to the data in the dual port RAM 13' so as to prepare for the case where the main computer 11' goes down.

As long as the clock signal is sent from the main computer 11', the switch 14 maintains the connection between the communication terminal groups 14a and 14e, so that the main computer 11' executes the communication processing with the objects 5a and 5b through the communication elements 100a and 100b. The switching to the main computer 11, 11', or 11" is accomplished in this manner.

Now, when the main computer 11' goes down, that is, when the clock signal from the main computer 11' is stopped, the switch 14 sends out the non-select signal from the select signal terminals 14b to all the main computers 11, 11', and 11". At the same time, the switch 14 sends out the select signal from the select signal terminal 14 d to the auxiliary computer 12, and connects the communication terminal group 14e to the communication terminal group 14a'.

The auxiliary computer 12 recognizes from the select signal that the main computer 11' has gone down. Then, the auxiliary computer 12 actually executes the processing which it has executed virtually, thereby succeeding to the processing executed by the main computer 11'. In this way, the auxiliary computer 12 deals with the cases where the main computer 11, 11', or 11" goes down.

Embodiment 4

Figure 4:
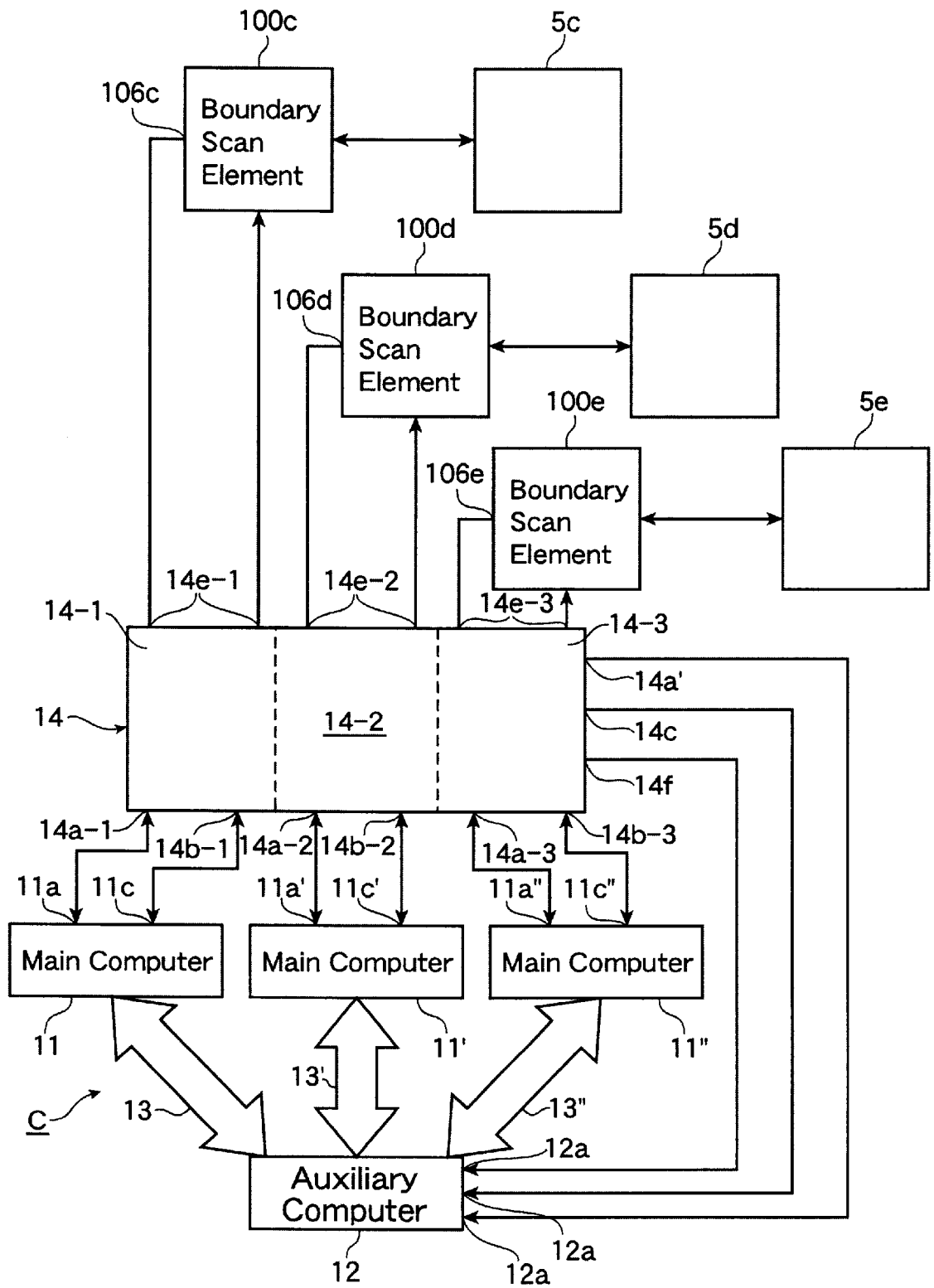
FIG. 4 is a block diagram of a fault tolerant computer system C according to a fourth embodiment of the present invention.
Figure 5A:
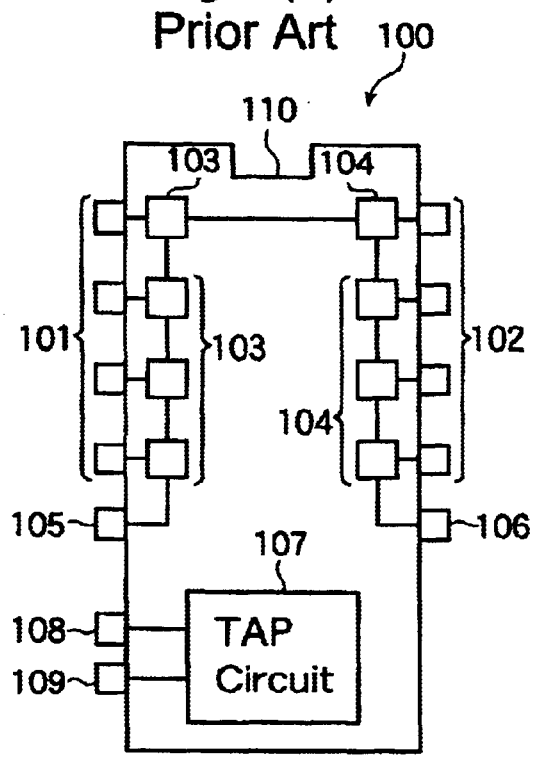
FIG. 5(a) is a block diagram of a boundary scan element 100.
Figure 5B:
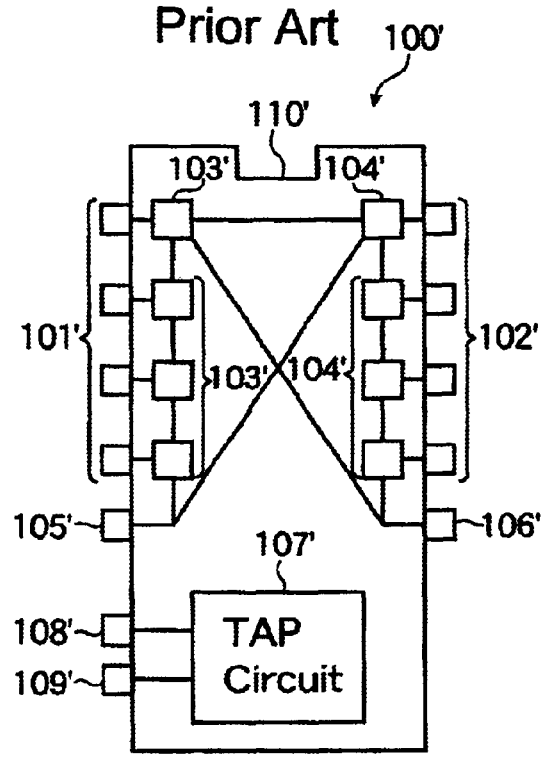
FIG. 5(b) is a block diagram of another boundary scan element 100'.
Figure 5C:
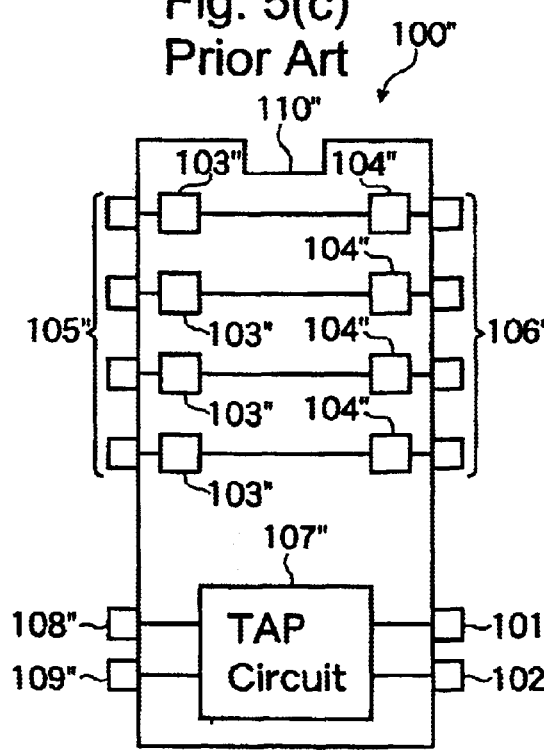
FIG. 5(c) is a block diagram of still another boundary scan element 100"
Figure 5D:
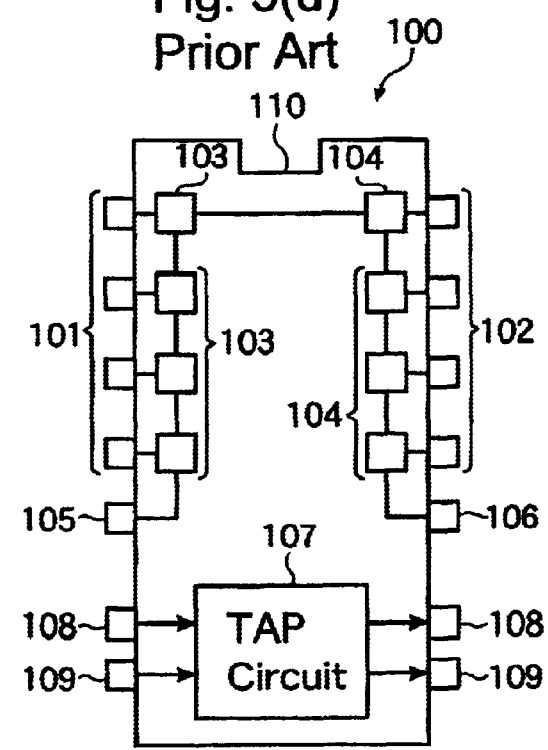
FIG. 5(d) is a block diagram of another mode of the boundary scan element 100.

Now, description will be given of a fourth embodiment of the: fault tolerant computer system according to the present invention. FIG. 4 is a block diagram of such fault tolerant computer system C.

Like the fault tolerant computer system according to the third embodiment described above, the fault tolerant computer system C has a plurality of main computers 11, 11', and 11' for executing different processing contents. This fourth embodiment, however, differs from the third embodiment in that the main computers 11, 11', and 11" are provided for objects 5c, 5d, and 5e which separately execute different processing contents, via communication elements 100c, 100d, and 100e on a one-on-one basis. The main computers 11, 11', and 11" are capable of concurrent processing to the objects 5c, 5d, and 5e, respectively. The entire system can apply nonstop, continuous processing to the objects 5c, 5d, and 5e. The switch 14 has a function of connecting the main computers 11, 11', and 11" to the objects 5c, 5d, and 5e, respectively, and driving them independently of each other. Thus, in order to achieve the connections and the switching of the connections between the main computers 11, 11', and 11" and the objects 5c, 5d, and 5e, respectively, the switch 14 is internally divided into switch units 14-1, 14-2, and 14-3.

Here, instead of the main computers 11, 11', and 11" concurrently handling the corresponding objects 5c, 5d, and 5e, respectively, a combination of one main computer and the object corresponding thereto may selectively execute its processing at a time. For that purpose, time-sharing techniques may be adopted to carry out time-shared operations. Alternatively, a master-slave relationship including a master computer and slave computers may be established among the main computers 11, 11', and 11" to put the entire system processing and administration under the control of the master computer. Other methods may also be adopted.

In any case, the fault tolerant computer system C includes the plurality of main computers 11, 11', and 11", an auxiliary computer 12, communication elements 100c, 100d, and 100e connected to the objects 5c, 5d, and 5e, respectively, and the switch 14. The switch 14 switches connection between one of the communication elements 100c, 100d, and 100e and either the corresponding main computers 11, 11', or 11", or the auxiliary computer 12.

As described above, the main computers 11, 11', and 11" are to execute separate processing from each other. They can perform operations according to the processing contents of the objects 5c, 5d, and 5e in a fashion independent of each other and concurrently with each other.

These processing operations are recognized in accordance with an operation instruction signal sent from the switch units 14-1, 14-2, and 14-3 of the switch 14 to operation instruction terminals 11c, 11c', and 11c" of the main computers 11, 11', and 11", respectively.

The main computers 11, 11', and 11" have communication terminal groups 11a, 11a', and 11a", each group corresponding to the data output terminal 1a, the data input terminal 1b, the TMS output terminal 1c, and the TCK output terminal 1d of the main computer 1 in the fault tolerant computer system A' described above. The main computers 11, 11', and 11" execute the same communication processing as that by the above-described main computer 1 through these communication terminal groups 11a, 11a', and 11a".

While three main computers are provided in this embodiment, the number of main computers is not limited thereto.

The auxiliary computer 12 can execute the processing contents to be executed by the main computers 11, 11', and 11".

Moreover, the auxiliary computer 12 has an identification signal terminal 12b for receiving from the switch 14 the signal for identifying which main computer 11, 11', or 11" actually executes the processing. In accordance with the identification signal from the switch 14, the auxiliary computer 12 identifies the main computer(s) 11, 11', and/or 11" in actual execution of the processing. In accordance with the processing status of the main computers 11, 11', and 11", the switch 14 outputs the identification signal, for example, based on the truth table shown as Table 1 below.

TABLE 1

| Main Computer 11 | Main Computer 11' | Main Computer 11" |
| --- | --- | --- |
| 1 | 1 | 1 |
| 1 | 1 | 0 |

TABLE 1-continued

| Main Computer 11 | Main Computer 11' | Main Computer 11" |
|---|---|---|
| 1 | 0 | 1 |
| 0 | 1 | 1 |
| 1 | 0 | 0 |
| 0 | 0 | 1 |
| 0 | 1 | 0 |
| 0 | 0 | 0 |

From the identification signal, the auxiliary computer 12 identifies which processing for the main computer(s) 11, 11', and/or 11" is executed. In the truth table above, the numeral "1" indicates the execution of the processing, whereas the numeral "0" indicates the inexecution of the processing. For example, if the switch 14 outputs an identification signal of "110," which corresponds to the data on the second column in the truth table, then it is shown that the main computers 11 and 11' are in operation and the main computer 11" is not in operation.

The auxiliary computer 12 further has a notification signal terminal 12d for receiving from the switch 14a notification signal indicating whether or not the main computer 11, 11', or 11" in operation (if a plurality of main computers are in operation, then either one of them) is down. Thereby, the auxiliary computer 12 identifies whether or not the main computer 11, 11', or 11" normally operates. The notification to the auxiliary computer 12 by the notification signal is made in such a manner that: unique code numbers are assigned to the main computers 11, 11', and 11" in advance, and the switch 14 outputs the code number of a main computer when the main computer goes down.

Meanwhile, the auxiliary computer 12 has a communication terminal group 12a corresponding to the data output terminal 2a, the data input terminal 2b, the TMS output terminal 2c, and the TCK output terminal 2d of the auxiliary computer 2 in the fault tolerant computer system A' described above. Through this communication terminal group, the auxiliary computer 12 executes the same communication processing as that by the above-described auxiliary computer 2.

Each of the main computers 11, 11', and 11" and the auxiliary computer 12 share corresponding dual port RAMs 13, 13', and 13". The main computers 11, 11', and 11" and the auxiliary computer 12 can freely write and read data to/from these corresponding dual port RAMs 13, 13', and 13". The main computers 11, 11', and 11" and the auxiliary computer 12 can mutually share these data.

Accordingly, when one or a plurality of main computers 11, 11', and/or 11" actually executing the processing are in normal operation, the auxiliary computer 12 keeps track of the processing which is being executed by the main computer or computers 11, 11', and/or 11", in accordance with the data written to one or a plurality of corresponding dual port RAMs 13, 13', and/or 13". This allows the auxiliary computer 12 to execute the same processing, so to speak, virtually. In this regard, when a plurality of main computers 11, 11', and/or 11" concurrently execute their processing, the virtual execution of the same processing by the auxiliary computer 12 may cause frequent and concurrent executions among a plurality of dual port RAMs 13, 13', and/or 13". This, however, can be dealt with by time-sharing, or temporary-save processing by using a buffer memory. Moreover, in preparation for the case where a plurality of main computers 11, 11', and/or 11" are in concurrent operation and then the plurality of main computers 11, 11' and/or 11" go down at the same time, priorities may be established in advance among the plurality of main computers 11, 11', and/or 11" according to predetermined conditions (significance, for example), so that the notification signal is sent on the basis of the priorities to the auxiliary computer 12 for succession of the processing.

The switch 14 has communication terminal groups 14a-1, 14a-2, 14a-3, and 14a'. The groups 14a-1, 14a-2, and 14a-3 are connected to the communication terminal groups 11a, 11a', and 11a" of the main computers 11, 11', and 11", respectively. Each of the groups 14a-1 through 14a-3 corresponds to the input terminal 4a, the output terminal 4b, the TMS input terminal 4c, and the TCK input terminal 4d of the switch 4 of the fault tolerant computer system A' described above. The communication terminal group 14a' is connected to the communication terminal group 12a of the auxiliary computer 12, and corresponds to the input terminal 4a', the output terminal 4b', the TMS input terminal 4c', and the TCK input terminal 4d' of the switch 4 of the system A'. The switch 14 also has communication terminal groups 14e-1, 14e-2, and 14e-3 each corresponding to the output terminal 4e, the input terminal 4f, the TMS output terminal 4g, and the TCK output terminal 4h of the switch 4 of the fault tolerant computer system A' described above. The aforementioned communication terminal groups 14a-1, 14a-2, and 14a-3 are provided for the switch units 14-1, 14-2, and 14-3 of the switch 14, respectively. Similarly, the aforementioned communication terminal groups 14e-1, 14e-2, and 14e-3 are provided for the switch units 14-1, 14-2, and 14-3 of the switch 14, respectively.

Having such communication terminal configuration, the switch 14 has the function of a PLD for establishing connection between the terminals in accordance with the presence or absence of the clock signal sent from one of the main computers 11, 11', and 11" being selected. That is, the switch 14 either connects the communication terminal groups 14e-1, 14e-2, and 14e-3 to the corresponding communication terminal groups 14a-1, 14a-2, and 14a-3 to allow the processing on the main-computer side or connecting one of the groups 14e-1, 14e-2, and 14e-3 to the group 14a' to allow the processing on the auxiliary-computer 12 side.

The switch 14 further has the following terminals: instruction signal terminals 14b-1, 14b-2, and 14b-3 for sending out operation instruction signals to the main computer 11, 11', or 11" to be put in operation; an identification signal terminal 14c for sending to the auxiliary computer 12 an identification signal for identifying which main computer 11, 11', or 11" is in operation; and a notification signal terminal 14f for sending out a notification signal for notifying whether or not the main computer 11, 11', or 11" in operation is down. The above-mentioned instruction signal terminals 14b-1, 14b-2, and 14b-3 are provided for the switch units 14-1, 14-2, and 14-3 of the switch 14, respectively.

The relationship between the switch 14 and the communication elements 100c, 100d, and 100e is the same as that in the aforementioned fault tolerant computer system A'. Thus, description thereto is omitted here.

Next, description will be given of the function of the fault tolerant computer system C having such a constitution.

Initially, when one or a plurality of main computers 11, 11', and/or 11" are selected, e.g., when the main computers 11 and 11' are to execute their processing, the main computers 11 and 11' send out an instruction signal from the instruction signal terminals 11c and 11c' to the switch 14, respectively, so that the switch 14 selects the main computers 11 and 11'. In response to this, the switch 14 sends out operation instruction signals from the instruction terminals 14b-1 and 14b-2 to the main computers 11 and 11', respectively, and a non-operation instruction signal from the instruction signal terminal 14b-3 to the main computer 11", thereby controlling the operation of the computers. Meanwhile, the switch 14 sends out an identification signal composed of the corresponding data in the truth table shown as Table 1 through the identification signal terminal 14c to the auxiliary computer 12, notifying the auxiliary computer 12 that the main computers 11 and 11' are in operation.

In accordance with this identification signal, the auxiliary computer 12 virtually executes the same processing as that by the main computers 11 and 11', with reference to the data in the dual port RAMs 13 and 13' so as to prepare for the case where the main computer 11 or 11' goes down.

As long as the clock signals are sent from the main computers 11 and 11', the switch 14 maintains the connection between the communication terminal groups 14a-1, 14a-2 and the corresponding groups 14e-1, 14e-2 so that the main computers 11, 11' execute the communication processing with the objects 5c, 5d through the communication elements 100c, 100d, respectively. The communication processing method is the same as that in the above-described fault tolerant computer system A'. Thus, description thereto is omitted here.

For example, when the main computer 11' out of the computers 11 and 11' goes down, i.e., when the clock signal from the main computer 11' is stopped, the switch 14 sends out the non-operation instruction signal from the instruction signal terminal 14b-2 to the main computer 11'. Meanwhile, the switch 14 keeps sending out the select signal from the instruction signal terminal 14b-1 to the main computer 11. At the same time, the switch 14 sends out a notification signal from the notification signal terminal 14f to the auxiliary computer 12, notifying that the main computer 11' has gone down. The switch 14 also connects the communication terminal group 14e-2 to the communication terminal group 14a' on the auxiliary computer 12 side.

The auxiliary computer 12 recognizes from this notification signal that the main computer 11' has gone down. Then, the auxiliary computer 12 actually executes the processing which it has executed virtually, thereby succeeding to the processing of the main computer 11'. In this manner, the auxiliary computer 12 deals with the cases where the main computer 11 or 11' goes down.

When the main' computer 11 is to be switched, e.g., when only the main computer 11' is to execute its processing, the main computer 11 sends out an instruction signal from the instruction signal terminal 11c to the switch 14 so that the switch 14 selects the main computer 11' alone. In response thereto, the switch 14 sends out the non-operation instruction signals from the instruction terminals 14b-1 and 14b-3 to the main computers 11 and 11", respectively, and sends out the operation instruction signal from the instruction signal terminal 14b-2 to the main computer 11'. At the same time, the switch 14 sends out an identification signal composed of the corresponding data in the truth table shown as Table 1 from the identification signal terminal 14c to the auxiliary computer 12, notifying the auxiliary computer 12 that the main computer 11' is in operation. In accordance with this identification signal, the auxiliary computer 12 virtually executes the same processing as that by the main computer 11', with reference to the data in the dual port RAM 13' so as to prepare for the case where the main computer 11' goes down.

As long as the clock signal is sent from the main computer 11', the switch 14 maintains the connection between the communication terminal groups 14a-2 and 14e-2, so that the main computer 11' executes the communication processing with the object 5d through the communication element 100d. The switching to the main computer 11, 11', or 11" is accomplished in this manner.

Now, when the main computer 11' goes down, that is, when the clock signal from the main computer 11' is stopped, the switch 14 sends out the non-operation instruction signal from the instruction signal terminal 14b-2 to the main computer 11'. Meanwhile, the switch 14 sends out a notification signal from the notification signal terminal 14f to the auxiliary computer 12, notifying that the main computer 11' has gone down. The switch 14 also connects the communication terminal group 14e-2 to the communication terminal group 14a' on the auxiliary computer 12 side.

The auxiliary computer 12 recognizes from this notification signal that the main computer 11' has gone down. Then, the auxiliary computer 12 actually executes the processing which it has executed virtually. Thus, the auxiliary computer 12 succeeds to the processing executed by the main computer 11'. In this way, the auxiliary computer 12 deals with the cases where the main computer 11, 11', or 11" goes down.

In FIG. 4 illustrating the fourth embodiment, the boundary scan elements 100c, 100d, and 100e are connected to the main computers 11, 11', and 11", respectively, on a one-on-one basis. However, the present invention is not limited thereto; each of the main computers may not be connected with any boundary scan element or may be connected with a plurality of boundary scan elements.

Moreover, a plurality of auxiliary computers may be provided in view of the fact that the plurality of main computers 11, 11', and 11" are connected with the plurality of boundary scan elements 100c, 100d, and 100e and the plurality of objects 5c, 5d, and 5e.

As described above, a fault tolerant computer system according to the present invention has: a main computer; an auxiliary computer for normally virtually executing the same processing as that executed by the main computer; I/O processing units serving as objects; and switching means for switching the connection between the I/O processing units and either the main computer or the auxiliary computer. This constitution allows the auxiliary computer to virtually execute quite the same data processing as that executed by the main computer, and to immediately succeed to the processing when the main computer goes down. Consequently, the auxiliary computer can succeed to the processing of the main computer very exactly to continue the processing without any suspension.

Moreover, according to another mode of the present invention, a fault tolerant computer system has: a main computer or main computers; an auxiliary computer for normally virtually executing the same processing as the processing executed by the main computer(s); communication elements connected to objects; and switch means for switching the connection between the communication elements and either the main computer(s) or the auxiliary computer, wherein the communication elements are boundary scan elements, and the switch means switch the above-mentioned connection in accordance with the presence or absence of a clock signal supplied from the main computer (s) to the communication elements. In this constitution, the switch means can normally connect the main computer(s) and the communication elements which are the boundary scan elements to make the main computer(s) handle the objects.

Various data communications between the main computer(s) and the objects are accomplished through the communication elements which are the boundary scan elements. Meanwhile, this constitution allows the auxiliary computer to virtually execute the same processing as that applied to the objects by the main computer(s).

When the main computer(s) goes down under such circumstances, the auxiliary computer can actually execute the processing of the main computer(s) to succeed to the processing very exactly without ever suspending the processing to the object devices. Moreover, whether or not the main computer(s) has gone down is determined in accordance with the presence or absence of the clock signal sent out from the main computer(s) as described above. The main computer(s) and the auxiliary computer do not have to mutually recognize that the main computer(s) is down or not. This offers an additional effect of avoiding the delay in the processing.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A fault tolerant computer system, comprising:

a main computer with a clock signal, an auxiliary computer for normally virtually executing a same processing as that executed by said main computer, an object alternatively connected to either said main computer or said auxiliary computer for executing data transmission or data reception, switch means connected to the object for switching a connection between the object and either said main computer or said auxiliary computer so that when the clock signal is sent from the main computer, the switch means connects the main computer to the object and sends a selected signal to the main computer, and when the clock signal of the main computer is stopped, the switch means connects the auxiliary computer to the object and sends a selected signal to the auxiliary computer, and a dual port RAM for storing data obtained by a processing communication between the main computer and the object, said dual port RAM being arranged to be shared by said main computer and said auxiliary computer such that the main computer writes the data obtained in the processing communication to the dual port RAM, the written data are shared by the main computer and auxiliary computer, and the auxiliary computer, if actuated, executes a same processing as that executed by the main computer by using the stored data.

2. A fault tolerant computer system according to claim 1, wherein said main computer is connected to external devices including communication means, processors, or various I/O devices for transmitting and receiving data to/from said main computer.

3. A fault tolerant computer system according to claim 1, further comprising a boundary scan element as a communication element connected between the object and said main and auxiliary computers, said switch means switching a connection between said communication element and either said main computer or said auxiliary computer such that when the clock signal is sent from the main computer, the switch means connects the main computer, and when the clock signal of the main computer is stopped, the switch means connects the auxiliary computer to the communication element and sends the selected signal to the auxiliary computer.

4. A fault tolerant computer system according to claim 3, wherein said main computer includes a plurality of main computers, and said switch means switches a connection between said communication element and either one of the plurality of main computers or the auxiliary computer, and allows data transmission and reception therebetween and to make said auxiliary computer execute a same processing as that executed by the main computer performing the data transmission and reception using data which the main computers write to the dual port RAM shared by the main computers and the auxiliary computer.

5. A fault tolerant computer system according to claim 4, wherein said plurality of main computers are provided with one auxiliary computer and a single set of the object and the communication element.

6. A fault tolerant computer system according to claim 4, wherein said object includes a plurality of objects, and said communication element includes a plurality of communication elements as the boundary scan elements, each of said plurality of communication elements being connected between each of the plurality of objects and each of the plurality of main computers and the auxiliary computer; said switch means connects said plurality of communication elements and said plurality of main computers, and performs switching connections between said communication elements and either said main computers or said auxiliary computer; and said switch means allows data transmission and reception between said plurality of main computers and said communication elements individually corresponding thereto, makes said auxiliary computer execute same processings as those executed by said main computers performing the data transmission and reception, and switches the connection between said communication elements and either said main computers or said auxiliary computer in a manner such that when the clock signal is sent from one of the plurality of main computers, the switch means connects said one of the main computers to the corresponding communication element and sends the selected signal to said one of the main computers, and when the clock signal of said one of the main computers is stopped, the switch means connects the auxiliary computer to the corresponding communication element and sends the selected signal to the auxiliary computer.

7. A fault tolerant computer system according to claim 6, wherein one auxiliary computer is provided for said plurality of main computers, and a set of the plurality of objects and the plurality of communication elements individually connected to said plurality of objects.

8. A fault tolerant computer system according to claim 6, wherein said auxiliary computer includes a plurality of auxiliary computers for the plurality of main computers and a set of the plurality of objects and the plurality of communication elements individually connected to said plurality of objects.

* * * * *